Dec. 8, 1931.   R. KILPPER   1,835,223
SCALE
Filed July 16, 1929.
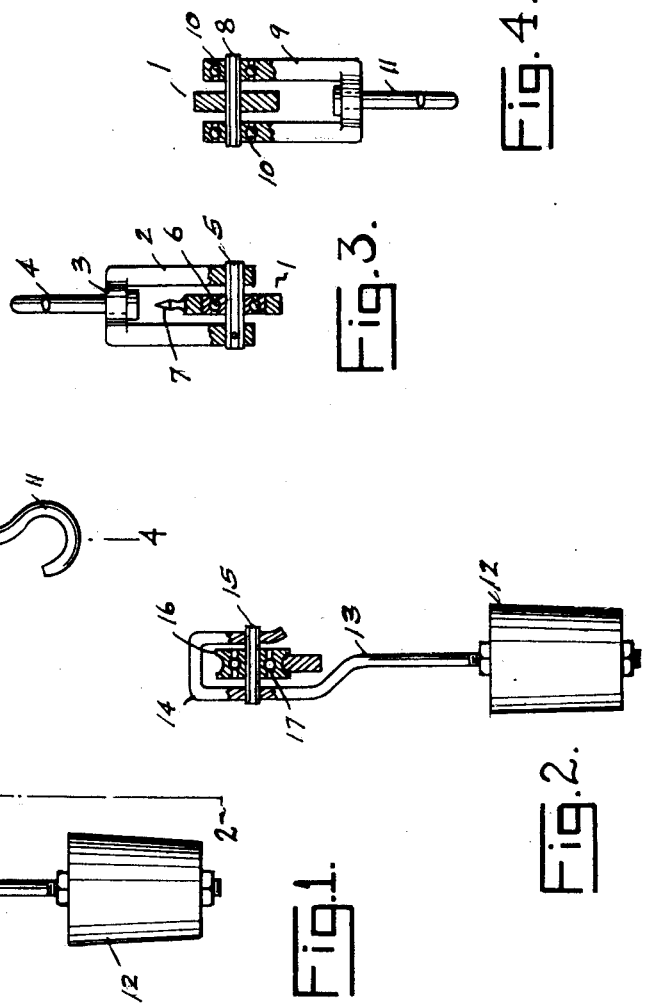
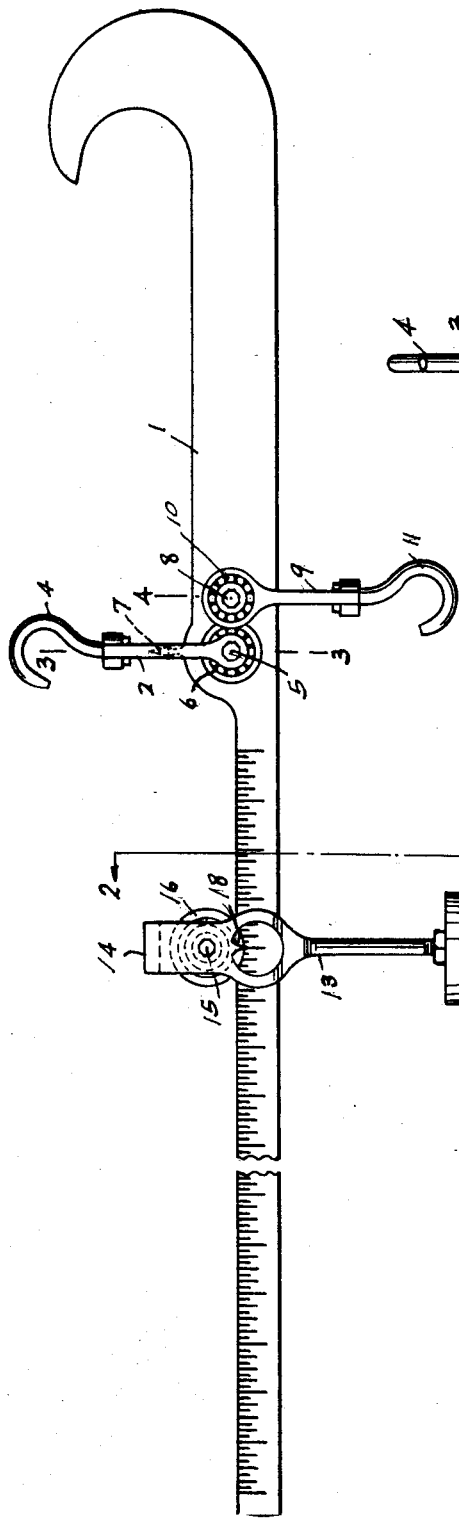
Rudolph Kilpper, Inventor
By Hardway & Cathey, Attorney

UNITED STATES PATENT OFFICE

RUDOLPH KILPPER, OF HOUSTON, TEXAS

SCALE

Application filed July 16, 1929. Serial No. 378,756.

This invention relates to new and useful improvements in a scale.

One object of the invention is to provide a weighing machine, of the character described, embodying the principle of the steelyard and having an improved type of bearings through which the beam is supported on its fulcrum and through which the load to be weighed is supported from the short arm of the beam, as well as a novel type of bearing from which the counter poise is supported from, and by means of which it may be moved along, the beam.

With the above and other objects in view this invention has particular relation to certain novel features of construction, operation and arrangement of parts, an example of which is given in this specification and illustrated in the accompanying drawings, wherein:—

Figure 1 shows a side view of the device.

Figure 2 shows a cross sectional view taken on the line 2—2 of Figure 1.

Figure 3 shows a cross sectional view taken on the line 3—3 of Figure 1, and

Figure 4 shows a cross sectional view taken on the line 4—4 of Figure 1.

Referring now more particularly to the drawings the numeral 1 designates the scale beam. There is a supporting clevis 2 whose arms embrace the beam and are connected by the cross bar 3. The hook 4 has a swivelling connection with said bar 3. A fulcrum rod is supported by the free ends of said arms and extends through said beam and the beam is supported on the fulcrum rod 5 by means of conventional ball bearings 6. The beam has an upstanding pointer 7 which indicates, by its relation to the clevis 2, the position of the beam in relation to a horizontal plane.

Spaced from the fulcrum rod 5 there is another transverse rod 8 and there is a depending clevis 9 whose arms embrace the beam 1 and are supported by, and have antifriction bearings 10, 10 on, said rod 8. There is a hook 11 which depends from, and has a swivelling connection with, the clevis 9.

The hook 11 is provided to support the load to be weighed.

In scales as now constructed, which embody the steelyard principle the arms of the clevis 2 and 9, and the beam 1, are provided, one with knive edge bearings which support the other, so that the beam is supported on a knife edge bearing on which it pivots and the clevis 9 is supported from said beam, and pivots on knife edge bearings carried either by said beam or by said clevis 9. When heavy loads are being weighed, these bearings soon become so worn that the friction of them prevent accuracy in weighing. In order to prevent this, the bearings shown, and hereinabove described, have been provided.

That portion of the beam between the rods 5 and 8 may be termed the short arm of the beam and that portion thereof beyond the fulcrum rod 5 may be termed the long arm of the beam. This long arm is graduated, or scaled, and there is a counterpoise weight 12 suspended on the rod 13 whose upper end terminates in a hook shaped bracket 14. The arms of this bracket support the bearing rod 15 on which the grooved wheel 16 is mounted. This wheel is mounted to run on the antifriction bearings 17, and the wheel runs along the long arm of the beam 1, which forms a track therefor. The bracket 14 carries the pointer 18, which cooperates with the graduated scale on the long arm of the beam, to designate the weight of the load on the hook 11.

Only one form of the scale has been shown and described but it is obvious that the principle embodied in the disclosure may be varied in construction within the scope of the invention as defined by the appended claims.

What I claim is:—

1. A scale including a beam, a supporting fulcrum on which the beam is poised, a supporting device for the load to be weighed attached to the beam on one side of the fulcrum, a counterpoise weight adjustable along the beam on the other side of the fulcrum, a bracket attached to said weight, a wheel mounted on antifriction bearings in the bracket and movable along the beam, antifriction bearings for said fulcrum and antifriction bearings for said load supporting device.

2. A scale including a beam, a supporting fulcrum on which the beam is poised, antifriction bearings incorporated into the fulcrum and supporting the beam, a load supporting device supported on antifriction bearings which in turn are supported by said beam on one side of the fulcrum, a counterpoise weight adjustable along the beam on the other side of said fulcrum, a roller movable along said beam and from which said weight is suspended.

3. A scale including a beam, a supporting fulcrum on which the beam is poised, antifriction bearings incorporated into said fulcrum and supporting the beam, antifriction bearings supported by the beam on one side of the fulcrum, a load supporting device supported by said last mentioned bearings, a counterpoise weight adjustable along the beam on the other side of the fulcrum, a bracket to which said weight is attached, a roller mounted on antifriction bearings in the bracket and movable along said beam as a track.

In testimony whereof I have signed my name to this specification.

RUDOLPH KILPPER.